May 2, 1950  J. T. MARSHALL  2,506,096
FLEXIBLE CONNECTOR FOR HIGH-PRESSURE CONDUITS
Filed Sept. 3, 1947
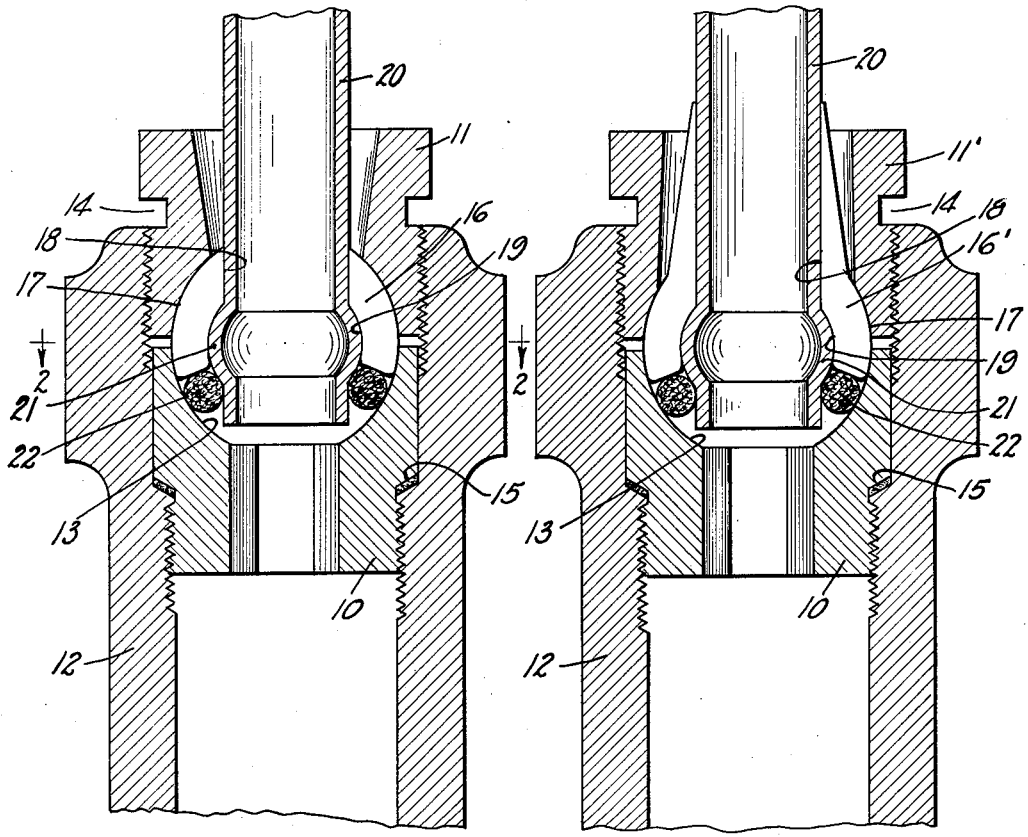
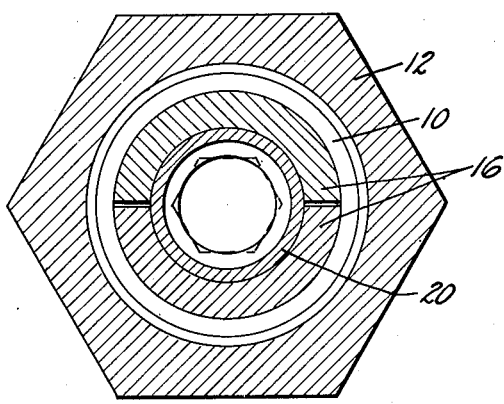
INVENTOR
JOHN T. MARSHALL
BY K. L. Doub
ATTORNEY Patented May 2, 1950

2,506,096

UNITED STATES PATENT OFFICE 2,506,096

FLEXIBLE CONNECTOR FOR HIGH-PRESSURE CONDUITS

John T. Marshall, South Bend, Ind., assignor to Bendix Aviation Corporation, South Bend, Ind., a corporation of Delaware Application September 3, 1947, Serial No. 771,888

8 Claims. (Cl. 285—95)

This invention relates to improvements in flexible connectors or fittings for high pressure fluid or hydraulic conduits, such as are ordinarily used in conducting liquid fuel to the spray nozzles of direct injection fuel systems for internal combustion engines, to spray nozzles of jet engine burners, or any high or low pressure fluid line in hydraulic systems such as machine tool devices, aircraft struts, aircraft hydraulic systems, steamship hydraulic systems or railroad hydraulic systems. In such systems, a fitting must be able to maintain a tight seal under vibration and rapid-fire high and low pressures during service, and it should also have the ability to flex universally within limits during installation, to avoid line strain on the fitting when the latter is tightened down; and it is the primary object of the present invention to provide a fitting which will meet the foregoing requirements.

These and other objects and advantages will become apparent in view of the following description taken in conjunction with the drawing, wherein:

Figure 1 is a view in substantially central vertical or longitudinal section of a fitting in accordance with the invention;

Figure 2 is a section taken on the line 2—2, Figure 1; and

Figure 3 is a view similar to Figure 1 of a modification.

Referring to the drawing in detail and first to Figure 1, the fitting is in the form of an assembly comprising an outer retaining sleeve made up of an inner base nut 10 and an outer nut 11, both of which are threaded externally for securement in a conduit member 12, here shown as the upper or outer portion of a direct injection nozzle, and each is formed internally with mating arcuate or spherical recesses coacting to provide a substantially spherical or ball-shaped clamping and bearing socket 13. An annular thread relief groove 14 may be formed in the top nut 11, if desired, to facilitate the formation of threads on the outer surfaces of said nut. The base nut 10 is preferably offset at 15 and seats on a coacting tapered or flattened offset formed in the conduit 12, so that when the base nut is tightened down, an effective seal against leakage is provided. The seal may be a lapped metal-to-metal joint, soft metal or a gasket.

A bearing member, herein termed a ferrule, is indicated at 16; it is shown as being split vertically or longitudinally and has an outer or external spherical surface 17 adapted to engage in the socket 13, and an internal opening 18 which is arcuately recessed annularly at 19. A tube or conduit 20 has its one extremity inserted in the opening 18 and is expanded or bulged at 21, the latter being adapted to engage in the recess 19 of the ferrule 16, thereby locking the tube to the ferrule and effectively retaining the tube in place irrespective of the high pressures to which it may be subjected. The lower end of the tube 20 projects beyond the ferrule 16 and is encircled by a seal ring 22. The annular locking bead or bulge 21 may be formed by a special tool, not shown, since such tool forms no part of the present invention.

The materials used for the various parts of the assembly may vary to suit conditions. In the type of installation shown, all parts with the exception of the seal rings 15 and 22 may be made of steel, but it will be obvious that copper, bronze, alloys and other metals or materials may be used as required.

When installing the fitting (assuming the one end of the tube 20 has been expanded to provide the bulge 19), the lower sleeve nut 10 may first be inserted and tightened down with a spanner wrench or other suitable tool, the one end of the tube 20 with the ferrule 16 and seal 22 assembled thereto may then be inserted, and finally the upper sleeve nut 11. Before the upper sleeve nut 11 is tightened down, or during the tightening process, the tube or pipe 20 may be flexed in any direction without imposing any strain on the tube walls. By having a certain amount of clearance between the sleeve nuts 10 and 11, the ball joint may be tightened to a point such that no movement of the parts is possible, or it may be tightened sufficiently to permit universal movement at the joint without danger of leakage. Should the ball joint move or become somewhat misaligned during service, due to vibration or other causes, there will again be no strain on the tube 20, since the latter can, within limits, take a position out of line with the conduit 12. The seal ring 22, when under pressure, acts to seal both the joint between the tube 20 and ferrule 16 and the joint between the ferrule and the nut 10.

In Figure 3, parts which correspond to those in Figure 1 have been given similar reference numerals. The difference in this instance lies in the shape of the ferrule, here indicated at 16', and the upper or outer sleeve nut indicated at 11'. The ferrule 16' is formed with a tapered extension which provides a firm support for the conduit 20, while the nut 11' has its interior surface enlarged to accommodate limited universal movement of the ferrule.

Although only two embodiments of the invention have been illustrated and described, certain limited changes in the form and relative arrangement of parts may be made to suit requirements. Thus, instead of having a separate inner nut 10, the lower or inner half of the ball-shaped socket 13 could be formed directly in the conduit member 12; also the latter could be a coupling union or fitting, either straight or elbow-shaped, with a half socket at one or both ends for receiving a tube end carrying the ferrule 19 and seal 22; such modifications being obvious to those versed in the art.

I claim:

1. A flexible coupling for connecting one conduit to another comprising means defining a substantially spherical half socket having a central opening for communicating the conduits, a ferrule-like member having an external spherical or ball shaped surface adapted to engage in said half socket, the one end of the other of said conduits to be coupled being locked to the interior of said ferrule, and a sleeve nut adapted to engage over the ferrule and having a spherical half socket mating with said first-named half socket to provide a complete ball shaped socket for the ferrule, said sleeve nut when tightened down clamping the ferrule in its socket.

2. A flexible coupling for connecting one conduit to another comprising means defining a substantially spherical half socket having a central opening for communicating the conduits, a ferrule-like member having an external spherical or ball shaped surface adapted to engage in said half socket and an internal annular recess into which the wall of the conduit is expanded to lock the ferrule to the conduit, and a sleeve nut adapted to engage over the ferrule and having a spherical half socket mating with said first-named half socket to provide a complete ball shaped socket for the ferrule, said ferrule being split longitudinally with respect to the conduit to facilitate assembly of the ferrule on the conduit, said sleeve nut when tightened down clamping the ferrule in its socket.

3. A flexible coupling for connecting one conduit to another comprising means defining a substantially spherical half socket in the end of one of said conduits and having a central opening for communicating the conduits, a substantially ball shaped ferrule-like member adapted to engage over the one end of the other of said conduits, said latter conduit having its wall shaped to engage the interior of the ferrule, said ferrule having a ball shaped external surface adapted to engage in said half socket, and a clamping nut formed with a half socket adapted to mate with said first named half socket and provide a complete ball shaped socket for the ferrule, the end of the conduit which carries the ferrule projecting beyond the latter, and a flexible seal ring adapted to encircle said projecting end of the conduit.

4. A flexible coupling for connecting one conduit to another comprising a coupling union having therein a substantially spherical half socket, a substantially ball shaped ferrule-like member adapted to engage over the end of one of said conduits, the interior of the ferrule being formed with an annular recess and the walls of the conduit within the ferrule being expanded for engagement in said recess, the ferrule having a ball shaped external surface adapted to engage in said half socket, a clamping nut adapted to engage over said ferrule for locking the ferrule in its socket, said nut being formed with a spherical half socket adapted to mate with said first named half socket and form a complete ball shaped socket for the ferrule, and a seal ring engaged over the end of said tube beyond the ferrule.

5. Means for connecting one conduit to another comprising a pair of sleeve nuts adapted for insertion and securement in the open end of one conduit, the contiguous end portions of said nuts having the inner walls thereof formed with mating spherical recesses coacting to provide a spherical or ball shaped clamping and bearing socket, the other of said conduits having a ferrule-like member secured on the contiguous end thereof, said ferrule member having an external spherical or rounded surface adapted to engage in said socket.

6. Means for connecting one conduit to another comprising a pair of externally threaded sleeve nuts adapted for threaded engagement with the interior of the open end of one conduit, the contiguous end portions of said nuts having the inner walls thereof formed with mating spherical recesses coating to provide a spherical or ball shaped clamping and bearing socket, the other of said conduits having a ferrule-like member secured on the contiguous end thereof, said ferrule having an external spherical or rounded surface adapted to engage in said socket, there being clearance between the contiguous ends of said nuts to permit a clamping action on said ferrule.

7. Means for connecting one conduit to another comprising a pair of externally threaded inner and outer sleeve nuts adapted for threaded engagement with the interior of the open end of one conduit, the contiguous end portions of said nut being formed interiorly with mating spherical recesses coacting to provide a spherical or ball shaped clamping and bearing socket, a ferrule-like member having an opening formed therethrough to receive the end portion of the other of said conduits, the interior of said ferrule being formed with an annular recess in which the walls of said other conduit are expanded to secure the ferrule to said latter conduit, the exterior surface of the ferrule being of ball shaped or arcuate contour for engagement in said socket, the relative sizes of said ferrule and socket being such as to provide clearance between the contiguous ends of said nuts so that when the outer nut is tightened down, the ferrule will be clamped in said socket.

8. Means for connecting a tube to a member having an open end adapted to receive one end of said tube comprising inner and outer sleeve nuts adapted to be threaded into the open end of said member, said nuts having mating arcuate recesses formed in the contiguous end portions thereof coacting to provide a ball shaped socket, a ferrule connected to the end of the tube and having an opening through which the end of the tube projects, the interior of ferrule surrounding said opening being formed with an annular arcuate recess into which the walls of the tube are expanded to lock the tube to the ferrule, the exterior surface of said ferrule being of ball or spherical shape for engagement in said socket, the end of said tube projecting beyond said ferrule, a sealing ring inserted over said projecting end between the latter and said ferrule, the inner nut and adjacent wall of said member being formed with coacting seats adapted to effect a seal between the latter nut and the member.

JOHN T. MARSHALL.

REFERENCES CITED

The following references are of record in the file of this patent:

UNITED STATES PATENTS

| Number | Name | Date |
|---|---|---|
| 717,882 | Martin | Jan. 6, 1903 |